US010204164B2

(12) United States Patent
Luo et al.

(10) Patent No.: US 10,204,164 B2
(45) Date of Patent: Feb. 12, 2019

(54) SYSTEMS AND METHODS FOR FILTERING MICROBLOGS

(71) Applicant: Tencent Technology (Shenzhen) Company Limited, Shenzhen (CN)

(72) Inventors: Wei Luo, Shenzhen (CN); Cheng Li, Shenzhen (CN); Hui Zheng, Shenzhen (CN); Zhenyu Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 809 days.

(21) Appl. No.: 14/795,318

(22) Filed: Jul. 9, 2015

(65) Prior Publication Data

US 2015/0310119 A1    Oct. 29, 2015

Related U.S. Application Data

(63) Continuation of application No. PCT/CN2014/081794, filed on Jul. 8, 2014.

(30) Foreign Application Priority Data

Jul. 8, 2013    (CN) .......................... 2013 1 0284727

(51) Int. Cl.
    *G06F 17/30*    (2006.01)
(52) U.S. Cl.
    CPC .............................. *G06F 17/30867* (2013.01)
(58) Field of Classification Search
    CPC combination set(s) only.
    See application file for complete search history.

(56) References Cited

U.S. PATENT DOCUMENTS 8,886,737 B1 * 11/2014 Thakur ................. G06Q 50/01
                                                       707/771
2011/0179114 A1 * 7/2011 Dilip ................. G06F 17/30867
                                                       709/204
(Continued)

FOREIGN PATENT DOCUMENTS

CN        102404239 A       4/2012
CN        102622374 A       8/2012
(Continued)

OTHER PUBLICATIONS

Patent Cooperation Treaty, International Search Report and Written Opinion of the International Searching Authority, dated Oct. 15, 2014, in PCT/CN2014/081794.
(Continued)

*Primary Examiner* — Syling Yen
*Assistant Examiner* — Bao G Tran
(74) *Attorney, Agent, or Firm* — Anova Law Group, PLLC

(57) ABSTRACT

Systems, devices and methods are provided for filtering microblogs. For example, one or more first subject terms are acquired based on at least information associated with content of a first microblog to be filtered; an attention term list is acquired corresponding to an user identification; one or more first degrees of attention corresponding to the first subject terms are acquired based on at least information associated with the attention term list; and whether to filter out the first microblog is determined based on at least information associated with the first degrees of attention.

21 Claims, 19 Drawing Sheets

(56) References Cited

U.S. PATENT DOCUMENTS

| | | | |
|---|---|---|---|
| 2012/0005217 A1 | 1/2012 | Zendejas et al. | |
| 2012/0066312 A1* | 3/2012 | Kandekar | G06F 17/30144 |
| | | | 709/205 |
| 2013/0036126 A1* | 2/2013 | Anderson | G06Q 30/0201 |
| | | | 707/754 |
| 2013/0073989 A1* | 3/2013 | Harris | G06Q 10/10 |
| | | | 715/758 |
| 2014/0019457 A1* | 1/2014 | Xie | G06F 17/30321 |
| | | | 707/741 |
| 2016/0171228 A1* | 6/2016 | Bhagat | G06Q 30/0282 |
| | | | 705/14.66 |

FOREIGN PATENT DOCUMENTS

| | | |
|---|---|---|
| CN | 102970324 A | 3/2013 |
| CN | 102999509 A | 3/2013 |

OTHER PUBLICATIONS

Patent Cooperation Treaty, International Preliminary Report on Patentability, dated Jan. 12, 2016, in PCT/CN2014/081794.
The State Intellectual Property Office of the People's Republic of China (SIPO) Office Action 1 for 201310284727.2 dated May 28, 2018 8 Pages (including translation).

\* cited by examiner

SYSTEMS AND METHODS FOR FILTERING MICROBLOGS

CROSS-REFERENCES TO RELATED APPLICATIONS

This application is a continuation of International Application No. PCT/CN2014/081794, with an international filing date of Jul. 8, 2014, now pending, which claims priority to Chinese Patent Application No. 201310284727.2, filed Jul. 8, 2013, both applications being incorporated by reference herein for all purposes.

BACKGROUND OF THE INVENTION

Certain embodiments of the present invention are directed to computer technology. More particularly, some embodiments of the invention provide systems and methods for microblogs. Merely by way of example, some embodiments of the invention have been applied to filtering microblogs. But it would be recognized that the invention has a much broader range of applicability.

With the development of the Internet technology, microblogs become important in social networking activities. In conventional microblog filtering methods, microblogs are filtered based on whether a first user reviews a microblog of one or more second users. If the first user reviews a microblog of the second users, the first user receives all microblogs of the second users.

The above-noted conventional technology has some disadvantages. For example, if the first user reviews a single microblog of the second users, all microblogs posted by the second users are pushed to the first user. Only part of the microblogs posted by the second users may be useful to the first user, and the rest of the microblogs, such as advertisements and microblogs not interesting to the first user, are junk information. Dissemination of such junk information consumes a lot of network resources.

Hence it is highly desirable to improve the techniques for filtering microblogs.

BRIEF SUMMARY OF THE INVENTION

According to one embodiment, a method is provided for filtering microblogs. For example, one or more first subject terms are acquired based on at least information associated with content of a first microblog to be filtered; an attention term list is acquired corresponding to an user identification; one or more first degrees of attention corresponding to the first subject terms are acquired based on at least information associated with the attention term list; and whether to filter out the first microblog is determined based on at least information associated with the first degrees of attention.

According to another embodiment, a device for filtering microblogs includes: a subject-term-acquisition module configured to acquire one or more first subject terms based on at least information associated with content of a first microblog to be filtered, an attention-term-list-acquisition module configured to acquire an attention term list corresponding to an user identification, and a microblog filtering module configured to acquire one or more first degrees of attention corresponding to the first subject terms based on at least information associated with the attention term list and determine whether to filter out the first microblog based on at least information associated with the first degrees of attention.

According to yet another embodiment, a non-transitory computer readable storage medium includes programming instructions for filtering microblogs. The programming instructions are configured to cause one or more data processors to execute certain operations. For example, one or more first subject terms are acquired based on at least information associated with content of a first microblog to be filtered; an attention term list is acquired corresponding to an user identification; one or more first degrees of attention corresponding to the first subject terms are acquired based on at least information associated with the attention term list; and whether to filter out the first microblog is determined based on at least information associated with the first degrees of attention.

For example, the devices and methods disclosed herein are configured to acquire degrees of attention corresponding to certain subject terms using an attention term list corresponding to a user identification and determine whether to filter out microblogs for each user according to the degrees of attention corresponding to the subject terms in the microblogs, so that microblogs that pass the filtering process are received by a terminal in order to reduce junk information and save network resources.

Depending upon embodiment, one or more benefits may be achieved. These benefits and various additional objects, features and advantages of the present invention can be fully appreciated with reference to the detailed description and accompanying drawings that follow.

DETAILED DESCRIPTION OF THE INVENTION

Figure 1:
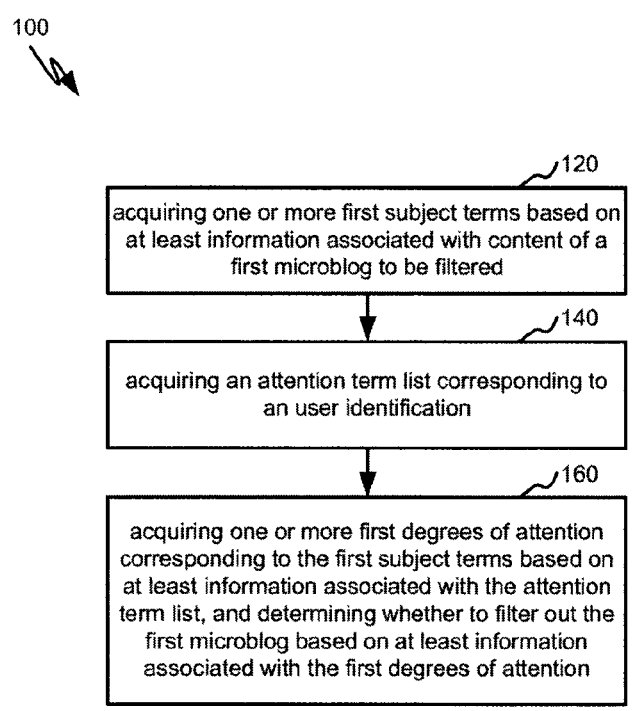
FIG. 1 is a simplified diagram showing a method for filtering microblogs according to one embodiment of the present invention.

FIG. 1 is a simplified diagram showing a method for filtering microblogs according to one embodiment of the present invention. The diagram is merely an example, which should not unduly limit the scope of the claims. One of ordinary skill in the art would recognize many variations, alternatives, and modifications. The method 100 includes at least processes 120-160.

According to certain embodiment, the method 100 is applied to a server configured to determine whether to push a microblog to a terminal according to certain filtering results. For example, the server includes one or more computers, such as a personal computer, a mainframe computer, a supercomputer, a computer cluster, etc. According to some embodiments, the method 100 is applied to a terminal configured to determine whether to receive a microblog pushed by a server according to certain filtering results. As an example, the terminal includes a smart phone, a tablet personal computer, a personal digital assistant, an e-book reader, an MP3 (Moving Picture Experts Group Audio Layer III) or an MP4 (Moving Picture Experts Group Audio Layer IV) player, a POS (Point Of Sale) terminal, a vehicle computer, a laptop computer, a desktop computer, etc.

According to one embodiment, the process 120 includes: acquiring one or more subject terms based on at least information associated with content of a microblog to be filtered. For example, subject terms include words or phrases showing a subject of content of the microblog.

Figure 2:
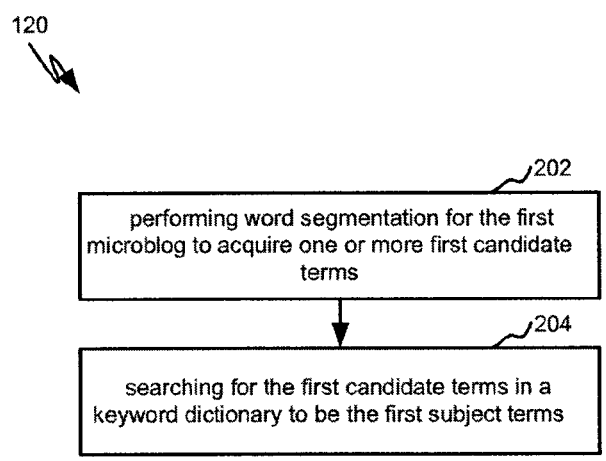
FIG. 2 is a simplified diagram showing a process for acquiring one or more first subject terms as part of the method as shown in FIG. 1 according to one embodiment of the present invention.

FIG. 2 is a simplified diagram showing a process for acquiring one or more first subject terms as part of the method as shown in FIG. 1 according to one embodiment of the present invention. The diagram is merely an example, which should not unduly limit the scope of the claims. One of ordinary skill in the art would recognize many variations, alternatives, and modifications. The process 120 includes at least processes 202 and 204.

According to one embodiment, the process 202 includes: performing word segmentation for the microblog to acquire one or more candidate terms. For example, word segmentation includes a process for segmenting a text sequence into individual words/terms. As an example, the individual candidate terms are acquired via word segmentation of the text information of the microblog. For example, the text information of the microblog includes: "I meant to update Wechat, browsers or other applications using the available bandwidth yesterday." The candidate terms obtained through word segmentation of the text information include: "I/ meant to/ update/ Wechat/, browsers/ or/ other/ applications/ using/ the/ available/ bandwidth/ yesterday/."

According to another embodiment, the process 204 includes: searching for the candidate terms in a keyword dictionary to be the subject terms. For example, the keyword dictionary includes a large collection of words/terms related to microblog subjects. As an example, the words/terms include nouns, such as "Internet" and "computer" and are obtained based on statistics of a large number of sample microblogs. In another example, certain words/terms, such as "of" and "also," irrelevant to the microblog subjects, are not be taken as the subject terms. If the candidate terms exist in the keyword dictionary, the candidate terms are taken as the subject terms of the microblog, according to some embodiments. For example, the text information of the microblog includes: "I meant to update Wechat, browsers or other applications using the available bandwidth yesterday." The candidate terms obtained through word segmentation of the text information include: "I/ meant to/ update/ Wechat/, browsers/ or/ other/ applications/ using/ the/ available/ bandwidth/ yesterday/." As an example, the candidate terms "WeChat," "bandwidth" and "browsers" exist in the keyword dictionary, thus are taken as the subject terms of the microblog.

Referring back to FIG. 1, the process 140 includes: acquiring an attention term list corresponding to an user identification, in some embodiments. For example, the user identification is configured to identify a network user uniquely and includes a microblog account of the user, an instant messaging number corresponding to the microblog account, identification of a terminal used by the user, etc. As an example, the attention term list corresponding to the user identification is pre-stored. As another example, multiple attention term lists may be pre-stored, and one or more attention term lists may be selected via user operations.

In one embodiment, the process 160 includes: acquiring one or more degrees of attention corresponding to the subject terms based on at least information associated with the attention term list, and determining whether to filter out the microblog based on at least information associated with the degrees of attention. For example, the subject terms are stored in the attention term list and associated with user attention. As an example, each subject term corresponds to a degree of attention which indicates the extent of user attention related to the subject of the microblog. The attention term list may be in the format of a table, texts, or a database, according to some embodiments. The subject terms associated with certain user attention and the corresponding degrees of attention are determined based on statistics related to receive microblogs corresponding to the user identification, so as to generate the attention term list corresponding to the user identification, according to certain embodiments.

In another embodiment, the method 100 further includes, after the process 160, a process containing: in response to the microblog not being filtered out, acquiring feedback information of the microblog and adjusting the degrees of attention corresponding to the subject terms in the attention term list based on at least information associated with the feedback information. For example, if the microblog is not filtered out, a terminal used by the user receives the microblog, and the user may comment, forward and support the received microblog via the terminal. As an example, the feedback information includes operations related to commenting, forwarding and supporting the received microblog via the terminal. After the feedback information is received, the degrees of attention corresponding to the subject terms available in the attention term list can be adjusted, in some embodiments. For example, the degree of attention corresponds to a percentage, and is adjusted through multiplying the degree of attention by a coefficient. The attention term list is adjusted according to the feedback information so as to achieve dynamic accumulation of user data and acquisition of user interest points, so that microblogs are filtered according to user needs, avoiding dissemination of junk information and saving network resources, according to some embodiments.

Figure 3:
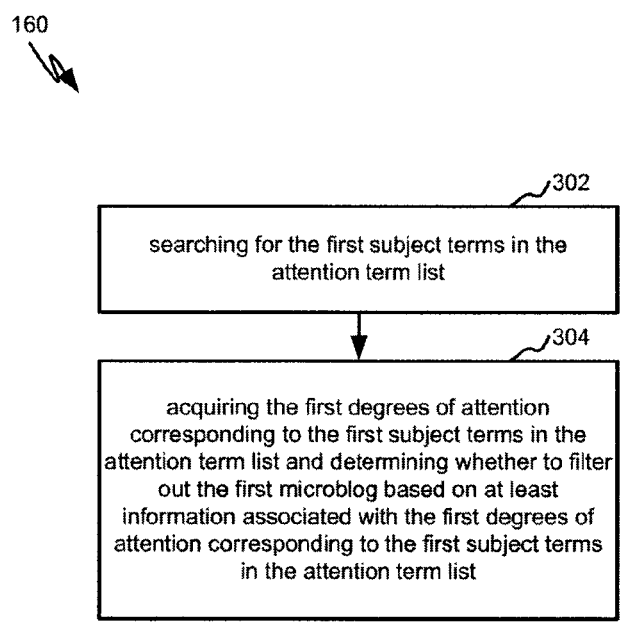
FIG. 3 is a simplified diagram showing a process for acquiring one or more degrees of attention corresponding to subject terms and determining whether to filter out microblog as part of the method as shown in FIG. 1 according to one embodiment of the present invention.

FIG. 3 is a simplified diagram showing a process for acquiring one or more degrees of attention corresponding to subject terms and determining whether to filter out the microblog as part of the method as shown in FIG. 1 according to one embodiment of the present invention. The diagram is merely an example, which should not unduly limit the scope of the claims. One of ordinary skill in the art would recognize many variations, alternatives, and modifications. The process 160 includes at least processes 302 and 304.

According to one embodiment, the process 302 includes: searching for the subject terms in the attention term list. Specifically, the subject terms that exist in the attention term list are located. For example, the subject terms acquired according to the content of the microblog include "WeChat," "bandwidth" and "browsers," where "WeChat," "bandwidth" and "browsers" exist in the attention term list corresponding to the user identification.

According to another embodiment, the process 304 includes: acquiring the degrees of attention corresponding to the subject terms in the attention term list and determining whether to filter out the microblog based on at least information associated with the degrees of attention corresponding to the subject terms in the attention term list. For example, one or more subject terms of the microblog exist in the attention term list. As an example, the degrees of attention corresponding to the subject terms in the attention term list are acquired. In another example, when a degree of attention corresponding to one subject term is not lower than a first filtering threshold, the microblog is not filtered out. Otherwise, the microblog is filtered out. In yet another example, a sum of the degrees of attention corresponding to all subject terms available in the attention term list is calculated. When the sum is not lower than a preset threshold, the microblog is not filtered out, according to some embodiments. That is, the server may push the microblog to the terminal used by the user, and the terminal used by the user may receive the microblog. Otherwise, the microblog is filtered out.

Figure 4:
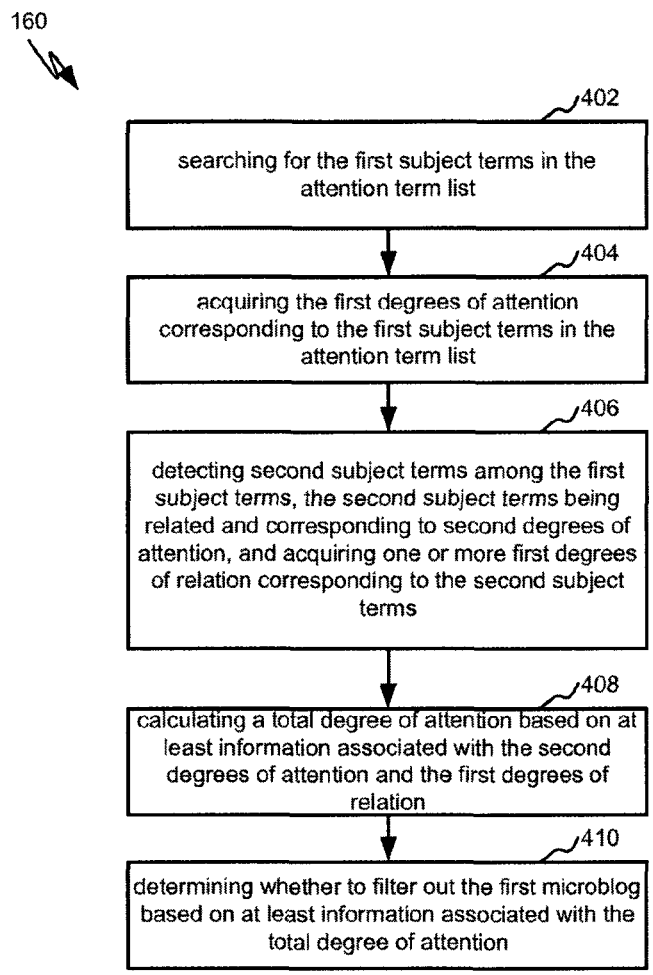
FIG. 4 is a simplified diagram showing a process for acquiring one or more degrees of attention corresponding to subject terms and determining whether to filter out microblog as part of the method as shown in FIG. 1 according to another embodiment of the present invention.

FIG. 4 is a simplified diagram showing a process for acquiring one or more degrees of attention corresponding to subject terms and determining whether to filter out the microblog as part of the method as shown in FIG. 1 according to another embodiment of the present invention. The diagram is merely an example, which should not unduly limit the scope of the claims. One of ordinary skill in the art would recognize many variations, alternatives, and modifications. The process 160 includes at least processes 402-410.

According to one embodiment, the process 402 includes: searching for the subject terms in the attention term list. Specifically, the subject terms that exist in the attention term list are located. According to another embodiment, the process 404 includes: acquiring the degrees of attention corresponding to the subject terms in the attention term list. For example, the degrees of attention corresponding to the subject terms in the attention term list are acquired from the attention term list.

According to yet another embodiment, the process 406 includes: detecting related subject terms among the subject terms, and acquiring one or more degrees of relation corresponding to the detected related subject terms. For example, the related subject terms include the subject terms related to each other. As an example, a mapping table for recording a mapping relation between the related subject terms may be preset and the relation corresponding to the related subject terms is recorded in the mapping table. In another example, a first number of times related to occurrence of one or more terms of a keyword dictionary in a sample set and a second number of times related to co-occurrence of pairwise terms in the sample set are detected. One or more degrees of relation related to of the related subject terms (e.g., the pairwise terms) based on at least information associated with the first number of times and the second number of times. In yet another example, whether the subject terms have corresponding mapping records in the mapping table may be detected. If the subject terms have corresponding mapping records in the mapping table, the mapping records of two subject terms in the mapping table are acquired and the degree of relation corresponding to the two subject terms (e.g., the related subject terms) is acquired.

In one embodiment, the process 408 includes: calculating a total degree of attention based on at least information associated with the degrees of attention and the degrees of relation. For example, one of the related subject terms is taken as a keyword. As an example, the total degree of attention of the keyword may be calculated via a formula $$\alpha + \sum_{i=1}^{n} \beta_i \gamma_i,$$

where $\alpha$ represents a corresponding degree of attention of the keyword in the attention term list, n represents the number of the subject terms related to the keyword, $\beta_i$ represents the degrees of attention corresponding to the subject terms related to the keyword, and $\gamma_i$ represents the relation between the subject terms related to the keyword and the keyword. As another example, the corresponding total attention may be calculated via each subject term as the keyword.

In another embodiment, the process 410 includes: determining whether to filter out the microblog based on at least information associated with the total degree of attention. For example, when the total attention of at least one subject term among the subject terms that exist in the attention term list is not lower than a second filtering threshold, the microblog is not filtered out. Otherwise, the microblog is filtered out.

In some embodiments, the total degree of attention is calculated according to the degrees of attention and the degrees of relation corresponding to the subject terms that exist in the attention term list, and thus whether the microblog is filtered out is judged according to the total degree of attention, so as to filter microblogs more accurately, avoid dissemination of junk information, and save network resources.

Figure 5:
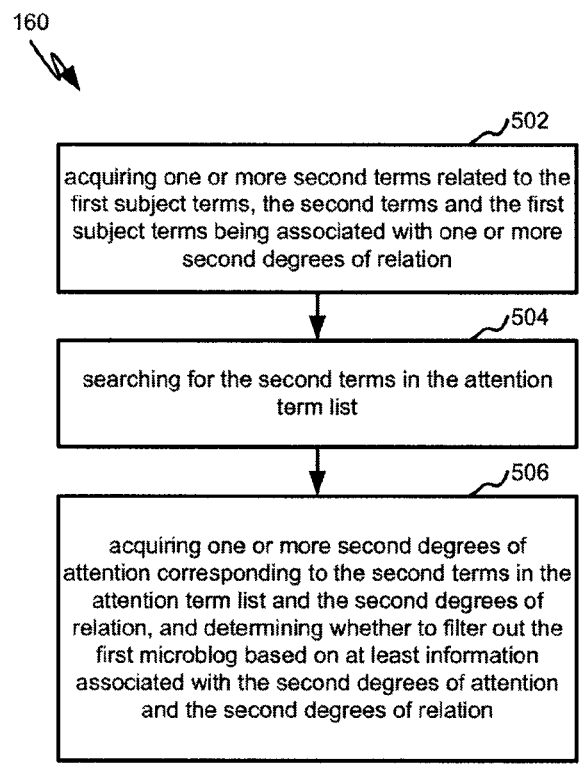
FIG. 5 is a simplified diagram showing a process for acquiring one or more degrees of attention corresponding to subject terms and determining whether to filter out microblog as part of the method as shown in FIG. 1 according to yet another embodiment of the present invention.

FIG. 5 is a simplified diagram showing a process for acquiring one or more degrees of attention corresponding to subject terms and determining whether to filter out microblog as part of the method as shown in FIG. 1 according to yet another embodiment of the present invention. The diagram is merely an example, which should not unduly limit the scope of the claims. One of ordinary skill in the art would recognize many variations, alternatives, and modifications. The process 160 includes at least processes 502-506.

According to one embodiment, the process 502 includes: acquiring one or more terms related to the subject terms, the acquired terms and the subject terms being associated with one or more degrees of relation. For example, the mapping table for related terms is searched for words/terms that are related to the subject terms and have degrees of relation larger than a relation threshold according to the subject terms. As an example, the located terms are taken as related terms for the subject terms. For example, the microblog includes: "I meant to update Wechat, browsers or other applications using the available bandwidth yesterday." The word segmentation results include: "I/ meant to/ update/ Wechat/, browsers/ or/ other/ applications/ using/ the/ available/ bandwidth/ yesterday/." The subject terms of the microblog include "WeChat," "bandwidth" and "browsers." As an example, a term "computer" has a degree of relation $\theta$ with "browsers" based on the mapping table. If $\theta$ is larger than the relation threshold, then "computer" is the related term for the subject term "browsers."

According to another embodiment, the process 504 includes: searching for the related terms in the attention term list. For example, whether the related terms acquired during the process 502 exist in the attention term list corresponding to the user identification is determined. As an example, if the related terms exist in the attention term list, it indicates that the user pays attention to the related terms in addition to the subject terms of the microblog.

According to yet another embodiment, the process 506 includes: acquiring one or more degrees of attention corresponding to the related terms in the attention term list and the degrees of relation and determining whether to filter out the microblog based on at least information associated with the degrees of attention and the degrees of relation. For example, the degrees of attention corresponding to the related terms may be acquired from the attention term list and the relation between the subject terms and the related terms of the microblog may be acquired from the mapping table. In some embodiments, when a sum of products of the degrees of attention and the degrees of relation of all related terms is not lower than a third filtering threshold, the microblog is not filtered out. Otherwise, the microblog is filtered out. For instance, there is a subject term "soccer" in the microblog. The related terms of the subject term are determined as "Chinese Super League" and "Sports." In the mapping table, the degree of relation between "soccer" and "Chinese Super League" is $\delta$ and the degree of relation between "soccer" and "Sports" is $\varepsilon$. In the attention term list, the degree of attention corresponding to "Chinese Super League" is $\alpha$ and the degree of attention corresponding to "Sports" is b. When $\alpha \times \delta + b \times \varepsilon$ is not lower than the third filtering threshold, the microblog is not filtered out. Otherwise, the microblog is filtered out, according to certain embodiments.

In some embodiments, whether the microblog is filtered out is determined through searching the degrees attention of the related terms and the corresponding relation between the subject terms and the related terms, so as to avoid dissemination of junk information and prevent filtering out information useful for users, so that microblogs are filtered more accurately and network resources are saved.

Figure 6:
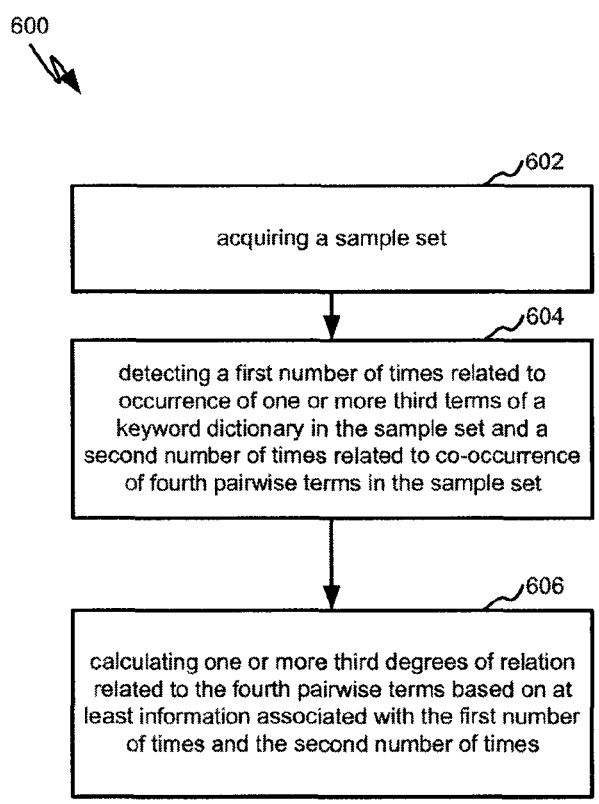
FIG. 6 is a simplified diagram showing a process for calculating degrees of relation as part of the method as shown in FIG. 1 according to one embodiment of the present invention.

FIG. 6 is a simplified diagram showing a process for calculating degrees of relation as part of the method as shown in FIG. 1 according to one embodiment of the present invention. The diagram is merely an example, which should not unduly limit the scope of the claims. One of ordinary skill in the art would recognize many variations, alternatives, and modifications. The process 600 includes at least processes 602-606.

According to one embodiment, the process 602 includes: acquiring a sample set. For example, the sample set includes a set of numerous microblogs, (e.g., received by a terminal). According to another embodiment, the process 604 includes: detecting a first number of times related to occurrence of one or more terms of a keyword dictionary in the sample set and a second number of times related to co-occurrence of pairwise terms in the sample set. For example, if two words/terms appear together many times in the sample set, it indicates that a degree of relation between the two words/terms is high. As an example, the degrees of relation are calculated via counting the times of individual terms occurring in the sample set and the times of the pairwise terms co-occurring in the sample set.

According to yet another embodiment, the process 606 includes: calculating one or more degrees of relation related to the pairwise terms based on at least information associated with the first number of times and the second number of times. In some embodiments, the degrees of relation are calculated using a positive relation function. For example, the text capacity of the sample set is 1,000 words. "Hero" occurs 100 times, and "league" occurs 80 times in the sample set. In addition, "hero" and "league" (in a particular order) co-occurs 50 times. A support degree of "hero" and "league" is 50/1,000, a first credibility degree of "hero" and "league" is 50/100, and a second credibility of "league" and "hero" is 50/80. The degree of relation between "league" and "hero" is acquired by introducing the support degree and the two credibility degrees to the positive relation function, e.g., a weighted sum of the support degree and the two credibility degrees. As an example, the calculated degree of relation between the two related subject terms is stored in a mapping table. In some embodiments, a degree of relation between pairwise words/terms is acquired through calculation, and a related term for the subject term is located based on the degree of relation. Whether the microblog is to be filtered out is determined based on the located related term, which improves the accuracy of microblog filtering, according to certain embodiments.

Figure 7:
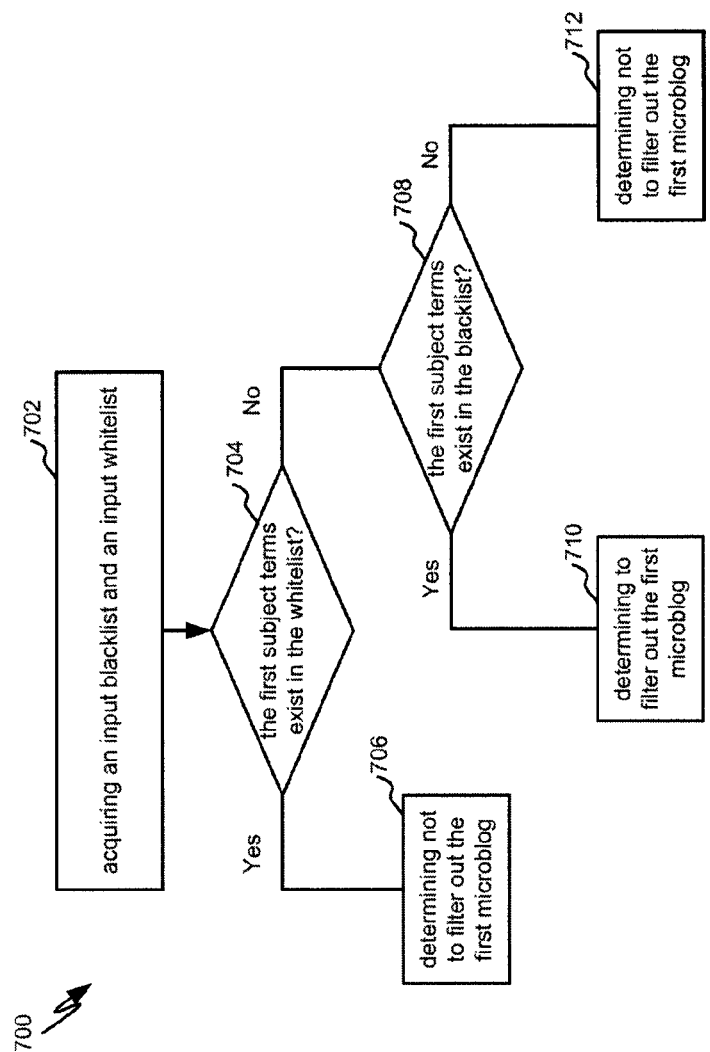
FIG. 7 is a simplified diagram showing a process for filtering a microblog according to a blacklist and a whitelist as part of the method as shown in FIG. 1 according to one embodiment of the present invention.

FIG. 7 is a simplified diagram showing a process for filtering a microblog according to a blacklist and a whitelist as part of the method as shown in FIG. 1 according to one embodiment of the present invention. The diagram is merely an example, which should not unduly limit the scope of the claims. One of ordinary skill in the art would recognize many variations, alternatives, and modifications. The process 700 includes at least processes 702-712. For example, the process 700 is executed after one or more subject terms are acquired from a microblog.

According to one embodiment, the process 702 includes: acquiring an input blacklist and an input whitelist. For example, the whitelist includes words/terms that are of interest to a user and are received by the user. In another example, the blacklist includes words/terms which are not of interest to the user and are rejected by the user. The words/terms in the blacklist and/or whitelist may be set by the user or acquired from a service platform, in some embodiments.

According to another embodiment, the process 704 includes: determining whether the first subject terms exist in the whitelist. For example, if the first subject terms exist in the whitelist, the process 706 is executed. In another example, if the first subject terms do not exist in the whitelist, the process 708 is executed.

According to yet another embodiment, the process 706 includes: determining not to filter out the first microblog. For example, if the subject terms are available in the whitelist, the microblog is needed by the user and is not filtered out. As an example, the priority of the whitelist may be configured to be higher than that of the blacklist. When the subject terms are available in both the whitelist and the blacklist, the microblog may not be filtered out if the priority of the whitelist is higher than that of the blacklist, according to certain embodiments.

In one embodiment, the process 708 includes: determining whether the first subject terms exist in the blacklist. For example, if the first subject terms exist in the blacklist, the process 710 is executed. Otherwise, the process 712 is executed. As an example, the process 710 includes: determining to filter out the first microblog. If the subject terms are not available in the whitelist but available in the blacklist, the microblog is not of interest to the user and is refused by the user, and thus the microblog is filtered out.

In another embodiment, the process 712 includes: determining not to filter out the first microblog. For example, if the subject terms are not available in either the whitelist or the blacklist, the microblog is not filtered out. In another example, the method 100 further includes: adding words/terms in the blacklist and/or words/terms in the whitelist to the attention term list, and setting degrees of attention corresponding to the words/terms in the blacklist and/or the words/terms in the whitelist. In yet another example, a degree of attention for a term in the whitelist is set to a high value (e.g., a maximum value in a range of degrees of attention, such as 100%). In yet another example, a degree of attention for a term in the blacklist is set to a low value (e.g., a minimum value in the range of degrees of attention, such as 0).

In some embodiments, when the method 100 is applied to a server, microblogs of interest to the user are pushed to the user and microblogs not of interest to the user are filtered out through setting the blacklist and/or the whitelist. For example; when the method 100 is applied to a terminal, microblogs of interest to the user are received and microblogs not of interest to the user are not received. Dissemination of junk information is avoided and network resources are saved, according to certain embodiments.

In one embodiment, an interface, through which a user sets for filtering microblogs according to the blacklist and/or the whitelist and the attention term list, is provided on the terminal. For example, through the interface, the user configures whether to filter microblogs according to the blacklist and the whitelist, or according to the attention term list. After the subject terms are acquired according to content of a microblog, when the subject terms exist in the whitelist, the microblog may not be filtered directly, in some embodiments. Whether the microblog is filtered out may be further determined according to the attention term list, in certain embodiments. When the subject terms do not exist in the whitelist, whether the subject terms do not exist in the blacklist may be further determined. When the subject terms do not exist in the blacklist, the microblog may be not filtered out directly, in some embodiments. Whether the microblog is filtered out may be further determined according to the attention term list, in certain embodiments.

Figure 8:
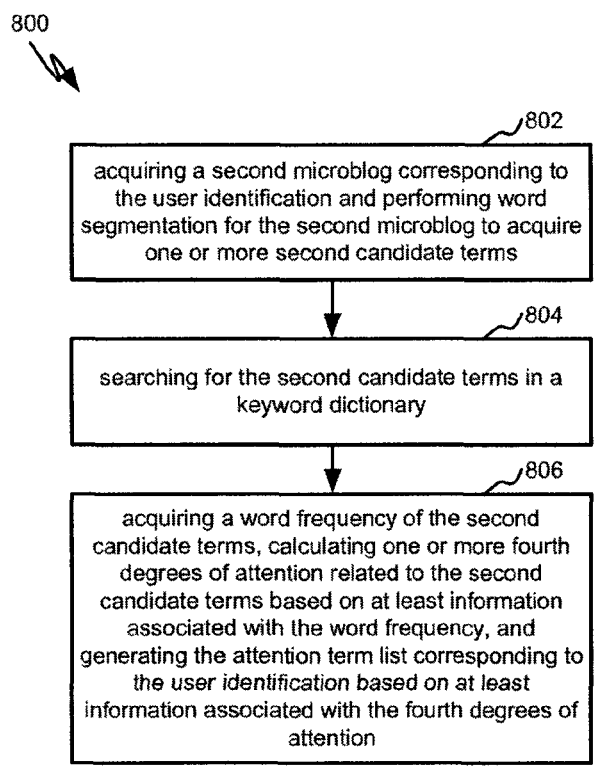
FIG. 8 is a simplified diagram showing a process for generating an attention term list as part of the method as shown in FIG. 1 according to one embodiment of the present invention.

FIG. 8 is a simplified diagram showing a process for generating an attention term list as part of the method as shown in FIG. 1 according to one embodiment of the present invention. The diagram is merely an example, which should not unduly limit the scope of the claims. One of ordinary skill in the art would recognize many variations, alternatives, and modifications. The process 800 includes at least processes 802-806.

According to one embodiment, the process 802 includes: acquiring a second microblog corresponding to the user identification and performing word segmentation for the second microblog to acquire one or more second candidate terms. Specifically, microblogs corresponding to all user identifications that are received are stored in a server and processed to obtain subject terms, which may of interest to users corresponding to the user identifications. For example, the process 804 includes: searching for candidate terms in a keyword dictionary.

According to another embodiment, the process 806 includes: acquiring a word frequency of the located candidate terms, calculating one or more degrees of attention related to the candidate terms based on at least information associated with the word frequency, and generating the attention term list corresponding to the user identification based on at least information associated with the degrees of attention. For example, a word frequency represents a number of times of the candidate terms occurring in the received microblogs. As an example, the user receives 100 microblogs, and the word "browser" appears three times. Then, the word frequency of "browser" is three, and the degree of attention of "browser" is 3/100=3%. The degree of attention may be calculated using other calculation methods according to the word frequency, according to certain embodiments. For example, whether the degrees of attention corresponding to the candidate words/terms are larger than a preset threshold may be determined. If the degree of attention corresponding to a candidate term is larger than a preset threshold, the candidate term and the corresponding degree of attention are added to the attention term list corresponding to the user identification.

In some embodiments, the degree of attention may be calculated automatically and the attention term list may be generated automatically through counting the word frequency of the candidate words/terms in the received microblogs and calculating the degree of attention according to the word frequency. For example, through updating the attention term list at any time according to the received microblogs of the user, user behaviors may be analyzed dynamically so as to acquire the microblog subjects of interest to the user, and junk information and useful information may be well distinguished, so that the junk information is filtered out more accurately and the network resources are saved.

Figure 9:
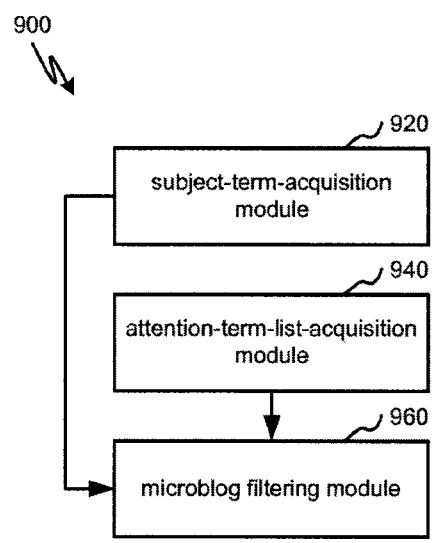
FIG. 9 is a simplified diagram showing a device for filtering microblogs according to one embodiment of the present invention.

FIG. 9 is a simplified diagram showing a device for filtering microblogs according to one embodiment of the present invention. The diagram is merely an example, which should not unduly limit the scope of the claims. One of ordinary skill in the art would recognize many variations, alternatives, and modifications. The device 900 includes: a subject-term-acquisition module 920, an attention-term-list-acquisition module 940, and a microblog filtering module 960.

According to one embodiment, the subject-term-acquisition module 920 is configured to acquire one or more first subject terms based on at least information associated with content of a first microblog to be filtered. For example, the attention-term-list-acquisition module 940 is configured to acquire an attention term list corresponding to an user identification. In another example, the microblog filtering module 960 is configured to acquire one or more first degrees of attention corresponding to the first subject terms based on at least information associated with the attention term list and determine whether to filter out the first microblog based on at least information associated with the first degrees of attention.

Figure 10:
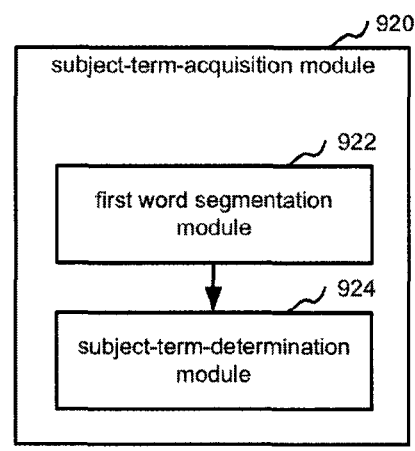
FIG. 10 is a simplified diagram showing a subject-term-acquisition module as part of the device for filtering microblogs as shown in FIG. 9 according to one embodiment of the present invention.

FIG. 10 is a simplified diagram showing a subject-term-acquisition module as part of the device for filtering microblogs as shown in FIG. 9 according to one embodiment of the present invention. The diagram is merely an example, which should not unduly limit the scope of the claims. One of ordinary skill in the art would recognize many variations, alternatives, and modifications.

According to one embodiment, the subject-term-acquisition module 920 includes: a first word segmentation module 922 configured to perform word segmentation for the first microblog to acquire one or more first candidate terms, and a subject-term-determination module 924 configured to search for the first candidate terms in a keyword dictionary to be the first subject terms.

Figure 11:
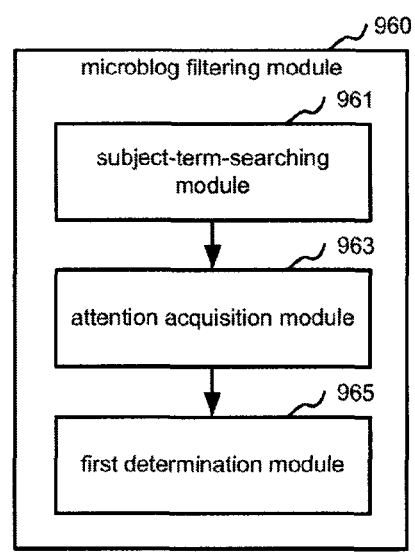
FIG. 11 is a simplified diagram showing a microblog filtering module as part of the device for filtering microblogs as shown in FIG. 9 according to one embodiment of the present invention.

FIG. 11 is a simplified diagram showing a microblog filtering module as part of the device for filtering microblogs as shown in FIG. 9 according to one embodiment of the present invention. The diagram is merely an example, which should not unduly limit the scope of the claims. One of ordinary skill in the art would recognize many variations, alternatives, and modifications.

According to one embodiment, the microblog filtering module 960 includes: a subject-term-searching module 961 configured to search for the first subject terms in the attention term list, an attention acquisition module 963 configured to acquire the first degrees of attention corresponding to the first subject terms in the attention term list, and a first determination module 965 configured to determine whether to filter out the first microblog based on at least information associated with the first degrees of attention corresponding to the first subject terms in the attention term list.

Figure 12:
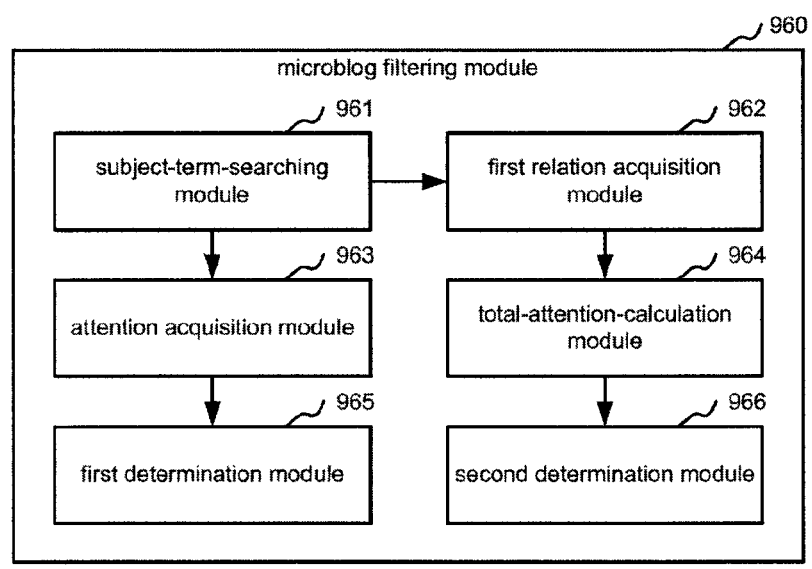
FIG. 12 is a simplified diagram showing a microblog filtering module as part of the device for filtering microblogs as shown in FIG. 9 according to another embodiment of the present invention.

FIG. 12 is a simplified diagram showing a microblog filtering module as part of the device for filtering microblogs as shown in FIG. 9 according to another embodiment of the present invention. The diagram is merely an example, which should not unduly limit the scope of the claims. One of ordinary skill in the art would recognize many variations, alternatives, and modifications.

According to one embodiment, the microblog filtering module 960 further includes: a first relation acquisition module 962 configured to detect second subject terms among the first subject terms, the second subject terms being related and corresponding to second degrees of attention and acquire one or more first degrees of relation corresponding to the second subject terms, a total-attention-calculation module 964 configured to calculate a total degree of attention based on at least information associated with the second degrees of attention and the first degrees of relation, and a second determination module 966 configured to determine whether to filter out the first microblog based on at least information associated with the total degree of attention.

Figure 13:
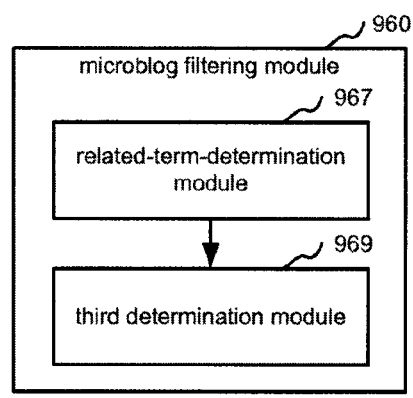
FIG. 13 is a simplified diagram showing a microblog filtering module as part of the device for filtering microblogs as shown in FIG. 9 according to yet another embodiment of the present invention.

FIG. 13 is a simplified diagram showing a microblog filtering module as part of the device for filtering microblogs as shown in FIG. 9 according to yet another embodiment of the present invention. The diagram is merely an example, which should not unduly limit the scope of the claims. One of ordinary skill in the art would recognize many variations, alternatives, and modifications.

According to one embodiment, the microblog filtering module 960 further includes: a related-term-determination module 967 configured to acquire one or more second terms related to the first subject terms, the second terms and the first subject terms being associated with one or more second degrees of relation and search for the second terms in the attention term list, and a third determination module 969 configured to acquire one or more second degrees of attention corresponding to the second terms in the attention term list and the second degrees of relation and determine whether to filter out the first microblog based on at least information associated with the second degrees of attention and the second degrees of relation.

Figure 14:
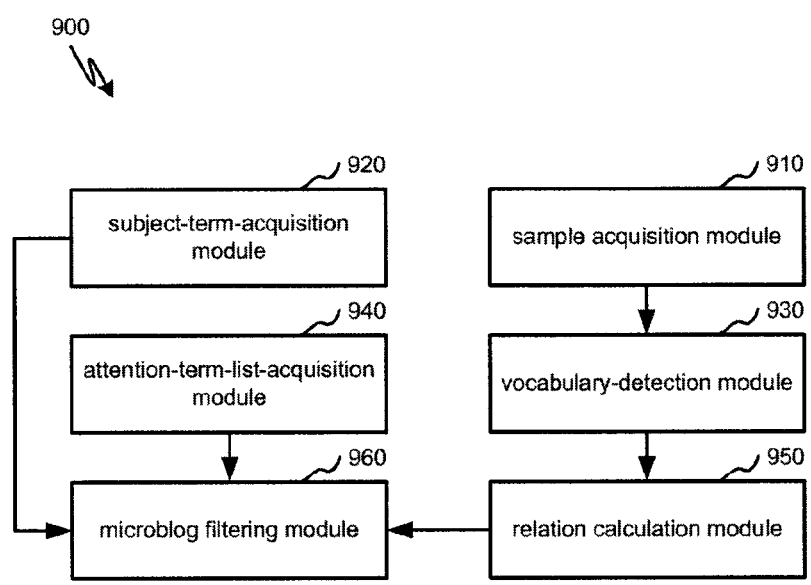
FIG. 14 is a simplified diagram showing a device for filtering microblogs according to another embodiment of the present invention.

FIG. 14 is a simplified diagram showing a device for filtering microblogs according to another embodiment of the present invention. The diagram is merely an example, which should not unduly limit the scope of the claims One of ordinary skill in the art would recognize many variations, alternatives, and modifications.

According to one embodiment, the device 900 further includes: a sample acquisition module 910 configured to acquire a sample set, a vocabulary-detection module 930 configured to detect a first number of times related to occurrence of one or more third terms of a keyword dictionary in the sample set and a second number of times related to co-occurrence of fourth pairwise terms in the sample set, and a relation calculation module 950 configured to calculate one or more third degrees of relation related to the fourth pairwise terms based on at least information associated with the first number of times and the second number of times.

Figure 15:
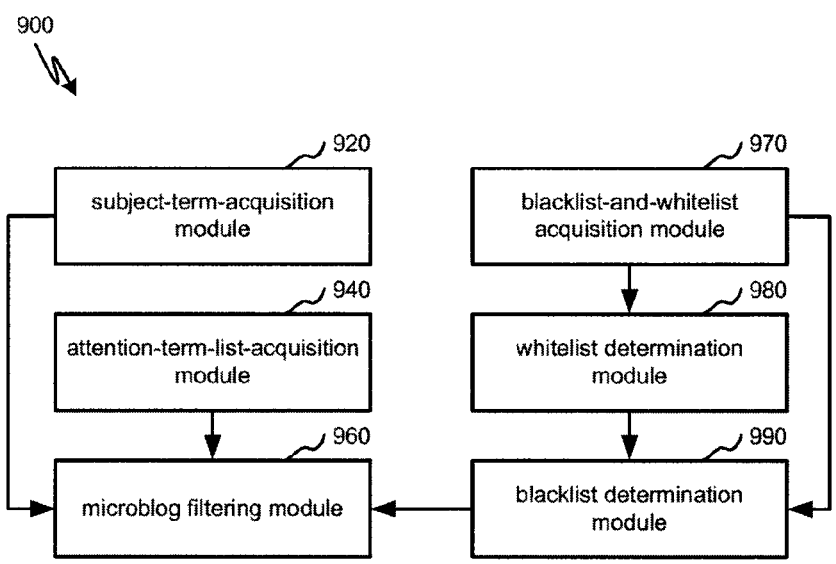
FIG. 15 is a simplified diagram showing a device for filtering microblogs according to yet another embodiment of the present invention.

FIG. 15 is a simplified diagram showing a device for filtering microblogs according to yet another embodiment of the present invention. The diagram is merely an example, which should not unduly limit the scope of the claims. One of ordinary skill in the art would recognize many variations, alternatives, and modifications.

According to one embodiment, the device 900 further includes: a blacklist-and-whitelist acquisition module 970 configured to acquire an input blacklist and/or an input whitelist, a whitelist determination module 980 configured to determine whether the first subject terms exist in the whitelist and, in response to the first subject terms existing in the whitelist, determine not to filter out the first microblog, and a blacklist determination module 990 configured to, in response to the first subject terms not existing in the whitelist, determine whether the first subject terms exist in the blacklist and, in response to the first subject terms existing in the blacklist, determine to filter out the first microblog.

Figure 16:
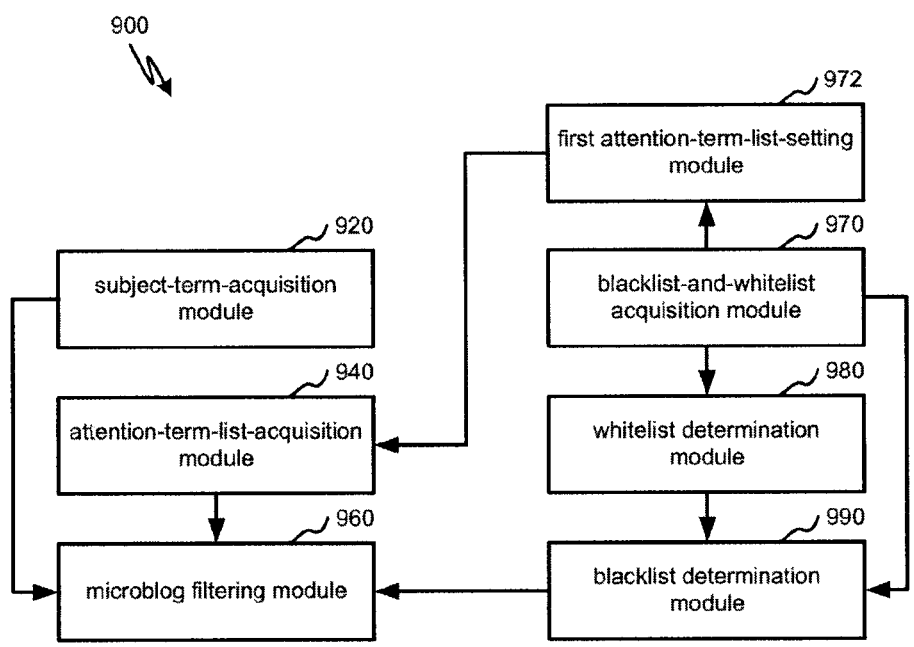
FIG. 16 is a simplified diagram showing a device for filtering microblogs according to yet another embodiment of the present invention.

FIG. 16 is a simplified diagram showing a device for filtering microblogs according to yet another embodiment of the present invention. The diagram is merely an example, which should not unduly limit the scope of the claims. One of ordinary skill in the art would recognize many variations, alternatives, and modifications.

According to one embodiment, the device 900 further includes: a first attention-term-list-setting module 972 configured to add one or more fifth terms in the blacklist and one or more sixth terms in the whitelist to the attention term list and set one or more third degrees of attention corresponding to the fifth terms and the sixth terms.

Figure 17:
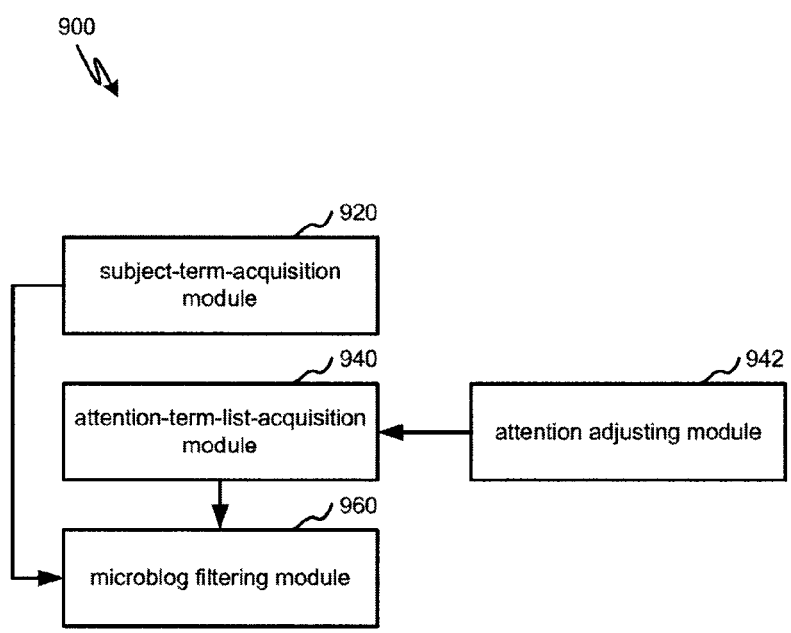
FIG. 17 is a simplified diagram showing a device for filtering microblogs according to yet another embodiment of the present invention.

FIG. 17 is a simplified diagram showing a device for filtering microblogs according to yet another embodiment of the present invention. The diagram is merely an example, which should not unduly limit the scope of the claims. One of ordinary skill in the art would recognize many variations, alternatives, and modifications.

According to one embodiment, the device 900 further includes: an attention adjusting module 942 configured to, in response to the first microblog not being filtered out, acquire feedback information of the first microblog and adjust the first degrees of attention corresponding to the first subject terms in the attention term list based on at least information associated with the feedback information.

Figure 18:
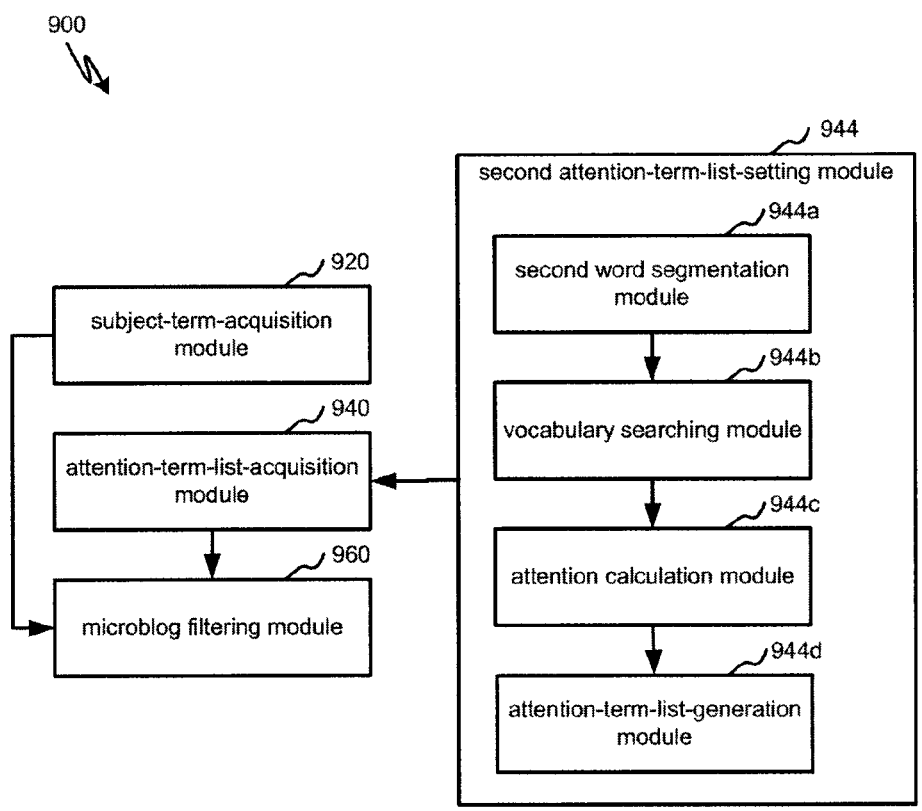
FIG. 18 is a simplified diagram showing a device for filtering microblogs according to yet another embodiment of the present invention.

FIG. 18 is a simplified diagram showing a device for filtering microblogs according to yet another embodiment of the present invention. The diagram is merely an example, which should not unduly limit the scope of the claims. One of ordinary skill in the art would recognize many variations, alternatives, and modifications.

According to one embodiment, the device 900 further includes: a second attention-term-list-setting module 944. For example, the second attention-term-list-setting module 944 includes: a second word segmentation module 944a configured to acquire a second microblog corresponding to the user identification and perform word segmentation for the second microblog to acquire one or more second candidate terms, a vocabulary searching module 944b configured to search for the second candidate terms in a keyword dictionary, an attention calculation module 944c configured to acquire a word frequency of the second candidate terms and calculate one or more fourth degrees of attention related to the second candidate terms based on at least information associated with the word frequency, and an attention-term-list-generation module 944d configured to generate the attention term list corresponding to the user identification based on at least information associated with the fourth degrees of attention.

Figure 19:
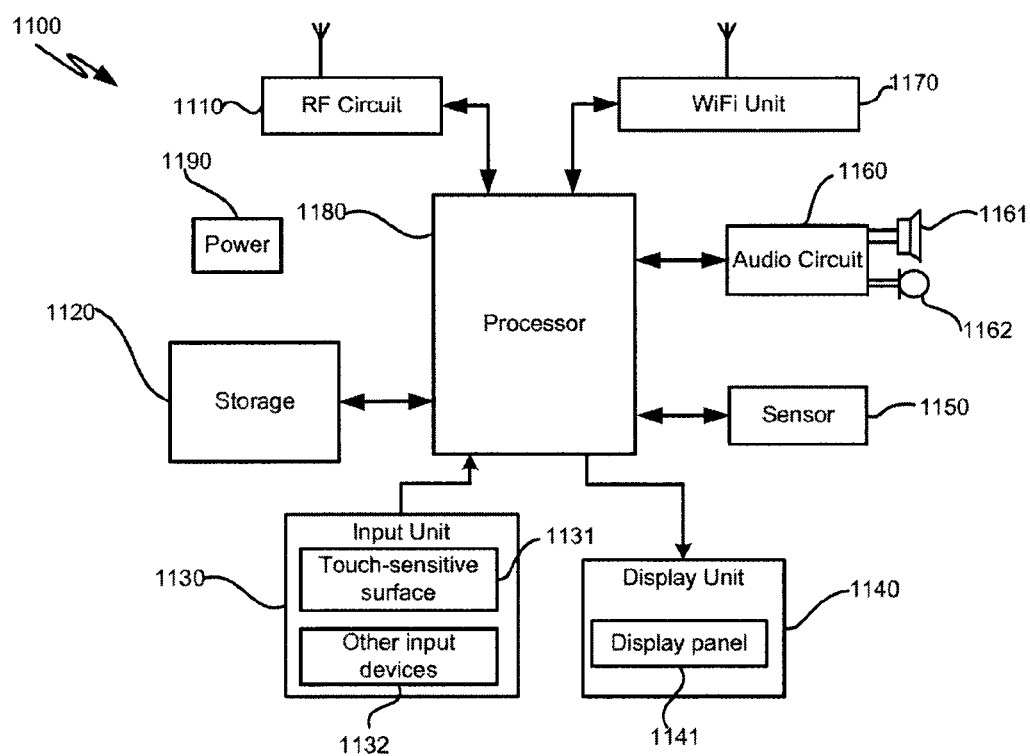
FIG. 19 is a simplified diagram showing a terminal for filtering microblogs according to one embodiment of the present invention.

FIG. 19 is a simplified diagram showing a terminal for filtering microblogs according to one embodiment of the present invention. The diagram is merely an example, which should not unduly limit the scope of the claims. One of ordinary skill in the art would recognize many variations, alternatives, and modifications. For example, the terminal 1100 includes a mobile phone, a tablet PC, a PDA (Personal Digital Assistant), a POS (Point of Sales terminal), a vehicle computer or any suitable terminal equipment.

According to one embodiment, the terminal 1100 (e.g., a mobile phone) includes a RF (i.e., radio frequency) circuit 1110, a memory 1120, an input unit 1130, a display unit 1140, a sensor 1150, an audio circuit 1160, a wireless communication module 1170, one or more processors 1180 that includes one or more processing cores, and a power supply 1190. For example, the RF circuit 1110 is configured to send/receive messages or signals in communication. As an example, the RF circuit 1110 receives a base station's downlink information, delivers to the processors 1180 for processing, and sends uplink data to the base station. For example, the RF circuit 1110 includes an antenna, at least one amplifier, a tuner, one or several oscillators, SIM (Subscriber Identity Module) card, a transceiver, a coupler, an LNA (Low Noise Amplifier) and/or a duplexer. In another example, the RF circuit 1110 communicates with the network and other equipments via wireless communication based on any communication standard or protocols, such as GSM (Global System of Mobile communication), GPRS (General Packet Radio Service), CDMA (Code Division Multiple Access), WCDMA (Wideband Code Division Multiple Access), LTE (Long Term Evolution), email, SMS (Short Messaging Service), etc.

According to another embodiment, the memory 1120 is configured to store software programs and modules. For example, the processors 1180 are configured to execute various functional applications and data processing by running the software programs and modules stored in the memory 1120. The memory 1120 includes a program storage area and a data storage area, where the program storage area may store the operating system, and the application(s) required by one or more functions (e.g., an audio player or a video player), in some embodiments. For example, the data storage area stores the data created based on the use of the terminal 1100 (e.g., audio data or a phone book). In another example, the memory 1120 includes a high-speed random access storage, a non-volatile memory, one or more floppy disc storage devices, a flash storage device or other volatile solid storage devices. As an example, the memory 1120 further includes a memory controller to enable access to the memory 1120 by the processors 1180 and the input unit 1130.

According to yet another embodiment, the input unit 1130 is configured to receive an input number or character data and generate inputs for a keyboard, a mouse, and a joystick, optical or track signals relating to user setting and functional control. For example, the input unit 1130 includes a touch-sensitive surface 1131 and other input devices 1132. The touch-sensitive surface 1131 (e.g., a touch screen or a touch panel) is configured to receive the user's touch operations thereon or nearby (e.g., the user's operations on or near the touch-sensitive surface with a finger, a touch pen or any other appropriate object or attachment) and drive the corresponding connected devices according to the predetermined program. For example, the touch-sensitive surface 1131 includes two parts, namely a touch detector and a touch controller. The touch detector detects the position of user touch and the signals arising from such touches and sends the signals to the touch controller. The touch controller receives touch data from the touch detector, converts the touch data into the coordinates of the touch point, sends the coordinates to the processors 1180 and receives and executes the commands received from the processors 1180. For example, the touch-sensitive surface 1131 is of a resistance type, a capacitance type, an infrared type and a surface acoustic wave type. In another example, other than the touch-sensitive surface, the input unit 1130 includes the other input devices 1132. For example, the other input devices 1132 include one or more physical keyboards, one or more functional keys (e.g., volume control keys or switch keys), a track ball, a mouse and/or a joystick.

According to yet another embodiment, the display unit 1140 is configured to display data input from a user or provided to the user, and includes various graphical user interfaces of the terminal 1100. For example, these graphical user interfaces include menus, graphs, texts, icons, videos and a combination thereof. The display unit 1140 includes a display panel 1141 which contains a LCD (liquid crystal display), an OLED (organic light-emitting diode). As an example, the touch-sensitive surface can cover the display panel 1141. For example, upon detecting any touch operations thereon or nearby, the touch-sensitive surface sends signals to the processors 1180 to determine the type of the touch events and then the processors 1180 provides corresponding visual outputs on the display panel 1141 according to the type of the touch events. Although the touch-sensitive surface 1131 and the display panel 1141 are two independent parts for input and output respectively, the touch-sensitive surface 1131 and the display panel 1141 can be integrated for input and output, in some embodiments.

In one embodiment, the terminal 1100 includes a sensor 1150 (e.g., an optical sensor, a motion sensor or other sensors). For example, the sensor 1150 includes an environment optical sensor and adjusts the brightness of the display panel 1141 according to the environmental luminance. In another example, the sensor 1150 includes a proximity sensor and turns off or backlights the display panel when the terminal 1100 moves close to an ear of a user. In yet another example, the sensor 1150 includes a motion sensor (e.g., a gravity acceleration sensor) and detects a magnitude of acceleration in all directions (e.g., three axes). Particularly, the sensor 1150 detects a magnitude and a direction of gravity when staying still. In some embodiments, the sensor 1150 is used for identifying movements of a cell phone (e.g., a switch of screen direction between horizontal and vertical, related games, and a calibration related to a magnetometer) and features related to vibration identification (e.g., a pedometer or a strike). In certain embodiments, the sensor 1150 includes a gyroscope, a barometer, a hygroscope, a thermometer and/or an infrared sensor.

In another embodiment, the audio circuit 1160, a speaker 161, and a microphone 162 are configured to provide an audio interface between a user and the terminal 1100. For example, the audio circuit 1160 is configured to transmit electrical signals converted from certain audio data to the speaker that converts such electrical signals into some output audio signals. In another example, the microphone 162 is configured to convert audio signals into electrical signals which are converted into audio data by the audio circuit 1160. The audio data are processed in the processors 1180 and received by the RF circuit 1110 before being sent to another terminal, in some embodiments. For example, the audio data are output to the memory 1120 for further processing. As an example, the audio circuit 1160 includes an earphone jack for communication between a peripheral earphone and the terminal 1100.

According to some embodiments, the wireless communication module 1170 includes a WiFi (e.g., wireless fidelity, a short-distance wireless transmission technology) module, a Bluetooth module, an infrared communication module, etc. In some embodiments, through the wireless communication module 1170, the terminal 1100 enables the user to receive and send emails, browse webpages, and/or access stream media. For example, the terminal 1100 is configured to provide the user with a wireless broadband Internet access. In some embodiments, the wireless communication module 1170 is omitted in the terminal 1100.

According to one embodiment, the processors 1180 are the control center of the terminal 1100. For example, the processors 1180 is connected to various parts of the terminal 1100 (e.g., a cell phone) via various interfaces and circuits, and executes various features of the terminal 1100 and processes various data through operating or executing the software programs and/or modules stored in the memory 1120 and calling the data stored in the memory 1120, so as to monitor and control the terminal 1100 (e.g., a cell phone). As an example, the processors 1180 include one or more processing cores. In another example, the processors 1180 is integrated with an application processor and a modem processor, where the application processor mainly handles the operating system, the user interface and the applications and the modem processor mainly handles wireless communications. In some embodiments, the modem processor is not integrated into the processors 1180.

According to another embodiment, the terminal 1100 includes the power supply 1190 (e.g., a battery) that powers up various parts. For example, the power supply 1190 is logically connected to the processors 1180 via a power source management system so that the charging, discharging and power consumption can be managed via the power source management system. In another example, the power supply 1190 includes one or more DC or AC power sources, a recharging system, a power-failure-detection circuit, a power converter, an inverter, a power source state indicator, or other components. In yet another example, the terminal 1100 includes a camcorder, a Bluetooth module, etc. Specifically, the processors 1180 of the terminal 1100 load executable files/codes associated with one or more applications to the memory 1120 and run the applications stored in the memory 1120 according to the method 100 as shown in FIG. 1-FIG. 8.

According to one embodiment, a method is provided for filtering microblogs. For example, one or more first subject terms are acquired based on at least information associated with content of a first microblog to be filtered; an attention term list is acquired corresponding to an user identification; one or more first degrees of attention corresponding to the first subject terms are acquired based on at least information associated with the attention term list; and whether to filter out the first microblog is determined based on at least information associated with the first degrees of attention. For example, the method is implemented according to at least FIG. 1, FIG. 2, FIG. 3, FIG. 4, FIG. 5, FIG. 6, FIG. 7, and/or FIG. 8.

According to another embodiment, a device for filtering microblogs includes: a subject-term-acquisition module configured to acquire one or more first subject terms based on at least information associated with content of a first microblog to be filtered, an attention-term-list-acquisition module configured to acquire an attention term list corresponding to an user identification, and a microblog filtering module configured to acquire one or more first degrees of attention corresponding to the first subject terms based on at least information associated with the attention term list and determine whether to filter out the first microblog based on at least information associated with the first degrees of attention. For example, the device is implemented according to at least FIG. 9, FIG. 10, FIG. 11, FIG. 12, FIG. 13, FIG. 14, FIG. 15, FIG. 16, FIG. 17, and/or FIG. 18.

According to yet another embodiment, a non-transitory computer readable storage medium includes programming instructions for filtering microblogs. The programming instructions are configured to cause one or more data processors to execute certain operations. For example, one or more first subject terms are acquired based on at least information associated with content of a first microblog to be filtered; an attention term list is acquired corresponding to an user identification; one or more first degrees of attention corresponding to the first subject terms are acquired based on at least information associated with the attention term list; and whether to filter out the first microblog is determined based on at least information associated with the first degrees of attention. For example, the storage medium is implemented according to at least FIG. 1, FIG. 2, FIG. 3, FIG. 4, FIG. 5, FIG. 6, FIG. 7, and/or FIG. 8.

The above only describes several scenarios presented by this invention, and the description is relatively specific and detailed, yet it cannot therefore be understood as limiting the scope of this invention. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it is understood by those of skill in the art that there are other embodiments that are equivalent to the described embodiments. Accordingly, it is to be understood that the invention is not to be limited by the specific illustrated embodiments, but only by the scope of the appended claims.

The invention claimed is:

1. A method for filtering microblogs, the method comprising:
   acquiring one or more first subject terms based on at least information associated with content of a first microblog to be filtered;
   acquiring an attention term list corresponding to a user identification, the attention term list comprising a plurality of subject terms, and each subject term in the attention term list corresponding to a degree of attention which indicates an extent of user attention on a subject of the subject term, wherein the degree of attention of each subject term in the attention term list is determined based on at least one of preference settings or microblog interaction history of a user having the user identification;
   acquiring one or more first degrees of attention corresponding to the first subject terms based on at least information associated with the attention term list;
   determining whether to filter out the first microblog based on at least information associated with the first degrees of attention;
   in response to determining not to filter out the first microblog, pushing the first microblog to a user terminal logged in with the user identification, such that the user terminal receives the first microblog containing the content fitting user interest; and in response to determining to filter out the first microblog, excluding the first microblog from information pushed to the user terminal, such that dissemination of junk information is avoided and network resources are saved, wherein determining whether to filter out the first microblog comprises:

obtaining total degrees of attention corresponding to the one or more first subject terms, including: for each of the one or more the first subject term, detecting one or more related subject terms of a first subject term based on a preset mapping table, each of the one or more related subject terms corresponding to a second degree of attention which indicates an extent of attention of the user having the user identification;

acquiring one or more degrees of relation corresponding to the detected one or more related subject terms based on the preset mapping table, each degree of relation describing a relevance degree between a related subject term and the first subject term; and calculating a total degree of attention corresponding to the first subject term by combining a first degree of attention of the user corresponding to the first subject term, the one or more degrees of relation corresponding to the detected one or more related subject terms, and one or more second degrees of attention corresponding to the one or more related subject terms; and determining whether to filter out the first microblog by comparing the total degrees of attention with a filtering threshold.

2. The method of claim 1, wherein the acquiring one or more first subject terms based on at least information associated with content of a first microblog includes:

performing word segmentation for the first microblog to acquire one or more first candidate terms; and searching for the first candidate terms in a keyword dictionary to be the first subject terms.

3. The method of claim 1, wherein the acquiring one or more first degrees of attention corresponding to the first subject terms based on at least information associated with the attention term list includes:

searching for the first subject terms in the attention term list;

acquiring the first degrees of attention corresponding to the first subject terms in the attention term list; and determining whether to filter out the first microblog based on at least information associated with the first degrees of attention corresponding to the first subject terms in the attention term list.

4. The method of claim 3, the method further comprising:

acquiring a sample set;

detecting a first number of times related to occurrence of one or more third terms of a keyword dictionary in the sample set and a second number of times related to co-occurrence of fourth pairwise terms in the sample set; and calculating one or more third degrees of relation related to the fourth pairwise terms based on at least information associated with the first number of times and the second number of times.

5. The method of claim 1, wherein the acquiring one or more first degrees of attention corresponding to the first subject terms based on at least information associated with the attention term list and the determining whether to filter out the first microblog based on at least information associated with the first degrees of attention include:

acquiring one or more second terms related to the first subject terms, the second terms and the first subject terms being associated with one or more second degrees of relation;

searching for the second terms in the attention term list;

acquiring one or more second degrees of attention corresponding to the second terms in the attention term list and the second degrees of relation; and determining whether to filter out the first microblog based on at least information associated with the second degrees of attention and the second degrees of relation.

6. The method of claim 1, further comprising:

acquiring an input blacklist and an input whitelist;

determining whether the first subject terms exist in the whitelist;

in response to the first subject terms existing in the whitelist, determining not to filter out the first microblog; and in response to the first subject terms not existing in the whitelist, determining whether the first subject terms exist in the blacklist; and in response to the first subject terms existing in the blacklist, determining to filter out the first microblog.

7. The method of claim 1, further comprising:

adding one or more fifth terms in the blacklist and one or more sixth terms in the whitelist to the attention term list; and setting one or more third degrees of attention corresponding to the fifth terms and the sixth terms.

8. The method of claim 1, further comprising:

in response to the first microblog not being filtered out, acquiring feedback information of the first microblog; and adjusting the first degrees of attention corresponding to the first subject terms in the attention term list based on at least information associated with the feedback information.

9. The method of claim 1, further comprising:

acquiring a second microblog corresponding to the user identification;

performing word segmentation for the second microblog to acquire one or more second candidate terms;

searching for the second candidate terms in a keyword dictionary;

acquiring a word frequency of the second candidate terms;

calculating one or more fourth degrees of attention related to the second candidate terms based on at least information associated with the word frequency; and generating the attention term list corresponding to the user identification based on at least information associated with the fourth degrees of attention.

10. The method of claim 1, wherein acquiring one or more degrees of relation corresponding to the detected one or more related subject terms comprises:

acquiring a sample set including a plurality of microblogs, wherein a plurality of subject terms occur in the sample set;

detecting a first number of occurrences of the first subject term in the sample set; and for each of the one or more related subject term of the first subject term, detecting a second number of occurrences of a related subject term in the sample set;

detecting a third number of co-occurrences of the first subject term and the related subject term in the sample set; and calculating a degree of relation corresponding to the related subject term based on the first number, the second number, and the third number.

11. A device for filtering microblogs, the device comprising:

a memory; and a processor coupled to the memory and configured to:

acquire one or more first subject terms based on at least information associated with content of a first microblog to be filtered;

acquire an attention term list corresponding to a user identification, the attention term list comprising a plurality of subject terms, and each subject term in the attention term list corresponding to a degree of attention which indicates an extent of user attention on a subject of the subject term, wherein the degree of attention of each subject term in the attention term list is determined based on at least one of preference settings or microblog interaction history of a user having the user identification; and acquire one or more first degrees of attention corresponding to the first subject terms based on at least information associated with the attention term list;

determine whether to filter out the first microblog based on at least information associated with the first degrees of attention;

in response to determining not to filter out the first microblog, push the first microblog to a user terminal logged in with the user identification, such that the user terminal receives the first microblog containing the content fitting user interest; and in response to determining to filter out the first microblog, exclude the first microblog from information pushed to the user terminal, such that dissemination of junk information is avoided and network resources are saved, wherein when determining whether to filter out the first microblog, the processor is further configured to:

obtain total degrees of attention corresponding to the one or more first subject terms, including: for each of the one or more the first subject term, detect one or more related subject terms of a first subject term based on a preset mapping table, each of the one or more related subject terms corresponding to a second degree of attention which indicates an extent of attention of the user having the user identification;

acquire one or more degrees of relation corresponding to the detected one or more related subject terms based on the preset mapping table, each degree of relation describing a relevance degree between a related subject term and the first subject term; and calculate a total degree of attention corresponding to the first subject term by combining a first degree of attention of the user corresponding to the first subject term, the one or more degrees of relation corresponding to the detected one or more related subject terms, and one or more second degrees of attention corresponding to the one or more related subject terms; and determine whether to filter out the first microblog by comparing the total degrees of attention with a filtering threshold.

12. The device of claim 11, wherein the processor is further configured to:

perform word segmentation for the first microblog to acquire one or more first candidate terms; and search for the first candidate terms in a keyword dictionary to be the first subject terms.

13. The device of claim 11, wherein the processor is further configured to:

search for the first subject terms in the attention term list;

acquire the first degrees of attention corresponding to the first subject terms in the attention term list; and determine whether to filter out the first microblog based on at least information associated with the first degrees of attention corresponding to the first subject terms in the attention term list.

14. The device of claim 13, wherein the processor is further configured to:

acquire a sample set;

detect a first number of times related to occurrence of one or more third terms of a keyword dictionary in the sample set and a second number of times related to co-occurrence of fourth pairwise terms in the sample set; and calculate one or more third degrees of relation related to the fourth pairwise terms based on at least information associated with the first number of times and the second number of times.

15. The device of claim 11, wherein the processor is further configured to:

acquire one or more second terms related to the first subject terms, the second terms and the first subject terms being associated with one or more second degrees of relation and search for the second terms in the attention term list; and acquire one or more second degrees of attention corresponding to the second terms in the attention term list and the second degrees of relation and determine whether to filter out the first microblog based on at least information associated with the second degrees of attention and the second degrees of relation.

16. The device of claim 11, wherein the processor is further configured to:

acquire an input blacklist and an input whitelist;

determine whether the first subject terms exist in the whitelist and, in response to the first subject terms existing in the whitelist, determine not to filter out the first microblog;

in response to the first subject terms not existing in the whitelist, determine whether the first subject terms exist in the blacklist and, in response to the first subject terms existing in the blacklist, determine to filter out the first microblog.

17. The device of claim 11, wherein the processor is further configured to:

in response to the first microblog not being filtered out, acquire feedback information of the first microblog and adjust the first degrees of attention corresponding to the first subject terms in the attention term list based on at least information associated with the feedback information.

18. The device of claim 11, wherein the processor is further configured to:

acquire a second microblog corresponding to the user identification and perform word segmentation for the second microblog to acquire one or more second candidate terms;

search for the second candidate terms in a keyword dictionary;

acquire a word frequency of the second candidate terms and calculate one or more fourth degrees of attention related to the second candidate terms based on at least information associated with the word frequency; and generate the attention term list corresponding to the user identification based on at least information associated with the fourth degrees of attention.

19. The device of claim 11, wherein when acquiring the one or more degrees of relation corresponding to the detected one or more related subject terms, the processor is further configured to:

acquire a sample set including a plurality of microblogs, wherein a plurality of subject terms occur in the sample set;

detect a first number of occurrences of the first subject term in the sample set; and for each of the one or more related subject term of the first subject term, detect a second number of occurrences of a related subject term in the sample set;

detect a third number of co-occurrences of the first subject term and the related subject term in the sample set; and calculate a degree of relation corresponding to the related subject term based on the first number, the second number, and the third number.

20. A non-transitory computer readable storage medium comprising programming instructions for filtering microblogs, the programming instructions configured to cause one or more data processors to execute operations comprising:

acquiring one or more first subject terms based on at least information associated with content of a first microblog to be filtered;

acquiring an attention term list corresponding to a user identification, the attention term list comprising a plurality of subject terms, and each subject term in the attention term list corresponding to a degree of attention which indicates an extent of user attention on a subject of the subject term, wherein the degree of attention of each subject term in the attention term list is determined based on at least one of preference settings or microblog interaction history of a user having the user identification;

acquiring one or more first degrees of attention corresponding to the first subject terms based on at least information associated with the attention term list;

determining whether to filter out the first microblog based on at least information associated with the first degrees of attention;

in response to determining not to filter out the first microblog, pushing the first microblog to a user terminal logged in with the user identification, such that the user terminal receives the first microblog containing the content fitting user interest; and in response to determining to filter out the first microblog, excluding the first microblog from information pushed to the user terminal, such that dissemination of junk information is avoided and network resources are saved, wherein determining whether to filter out the first microblog comprises:

obtaining total degrees of attention corresponding to the one or more first subject terms, including: for each of the one or more the first subject term, detecting one or more related subject terms of a first subject term based on a preset mapping table, each of the one or more related subject terms corresponding to a second degree of attention which indicates an extent of attention of the user having the user identification;

acquiring one or more degrees of relation corresponding to the detected one or more related subject terms based on the preset mapping table, each degree of relation describing a relevance degree between a related subject term and the first subject term; and calculating a total degree of attention corresponding to the first subject term by combining a first degree of attention of the user corresponding to the first subject term, the one or more degrees of relation corresponding to the detected one or more related subject terms, and one or more second degrees of attention corresponding to the one or more related subject terms; and determining whether to filter out the first microblog by comparing the total degrees of attention with a filtering threshold.

21. The storage medium of claim 20, wherein acquiring one or more degrees of relation corresponding to the detected one or more related subject terms comprises:

acquiring a sample set including a plurality of microblogs, wherein a plurality of subject terms occur in the sample set;

detecting a first number of occurrences of the first subject term in the sample set; and for each of the one or more related subject term of the first subject term, detecting a second number of occurrences of a related subject term in the sample set;

detecting a third number of co-occurrences of the first subject term and the related subject term in the sample set; and calculating a degree of relation corresponding to the related subject term based on the first number, the second number, and the third number.

\* \* \* \* \*